Jan. 3, 1950 S. L. CASELLA ET AL 2,493,475
MACHINE TOOL
Filed June 1, 1945 6 Sheets-Sheet 1

INVENTORS
SECONDO L. CASELLA
ROBERT KURZWEIL
BY JUVENTINO JOSE PESQUEIRA

J.B.Felshin
ATTORNEY

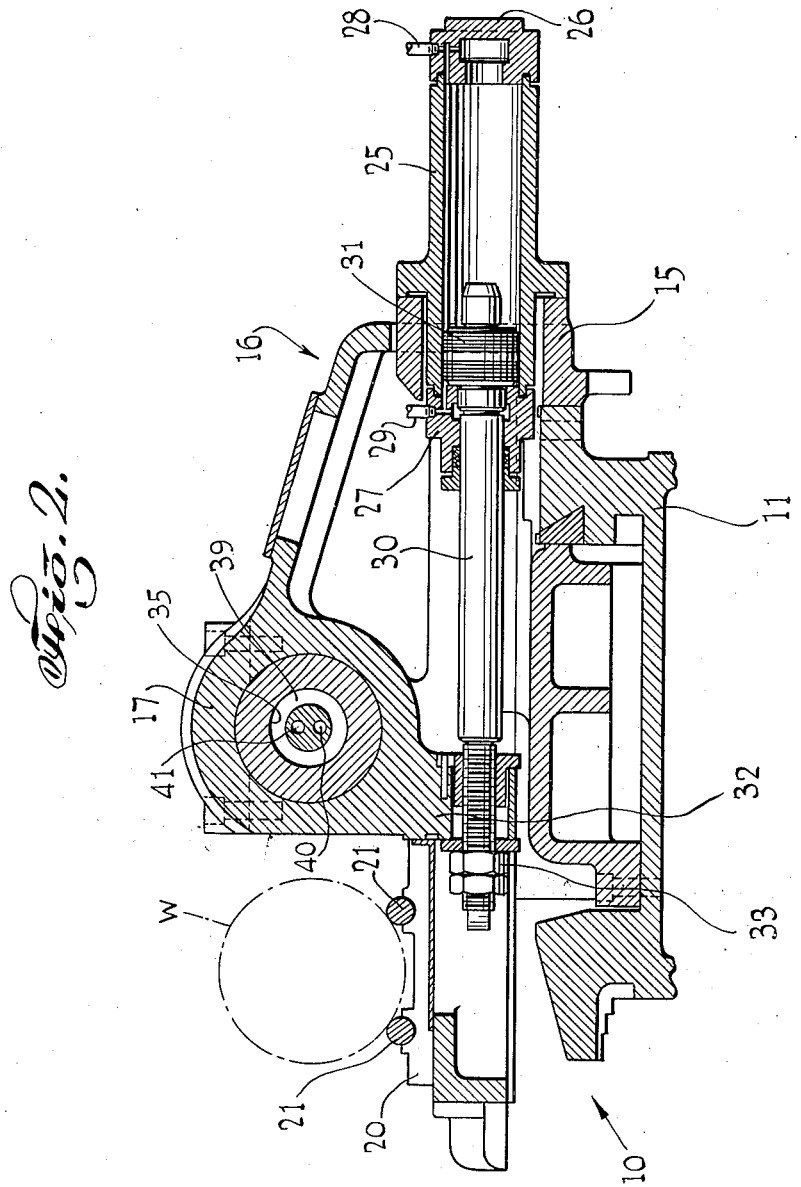

Jan. 3, 1950 S. L. CASELLA ET AL 2,493,475
MACHINE TOOL
Filed June 1, 1945 6 Sheets-Sheet 3
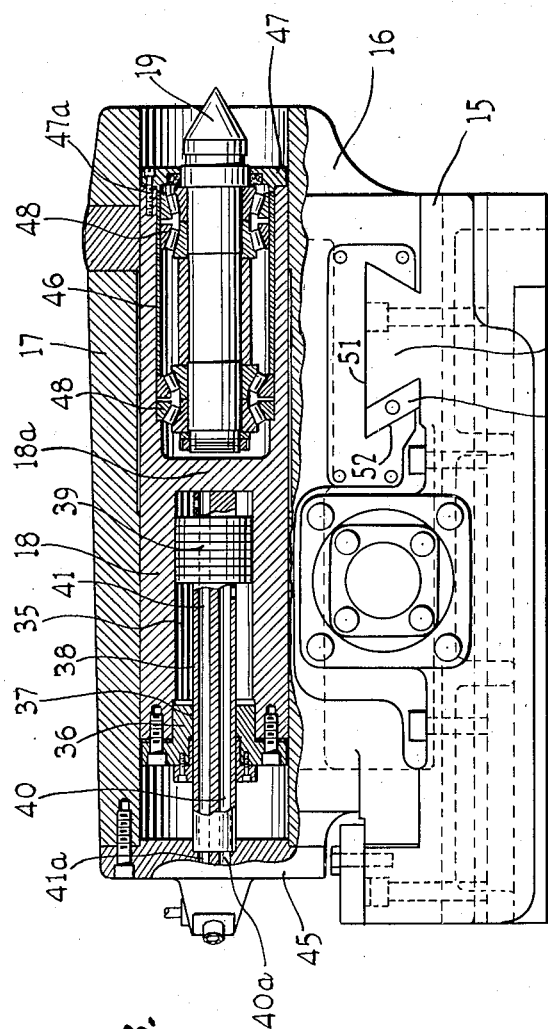
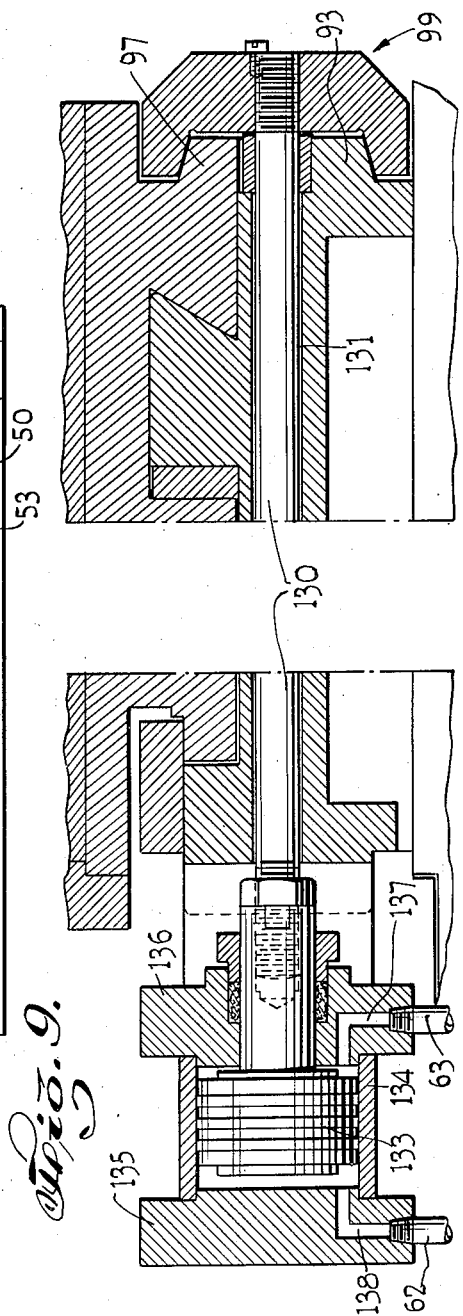
INVENTORS
SECONDO L. CASELLA
ROBERT KURZWEIL
BY JUVENTINO JOSE PESQUEIRA
ATTORNEY

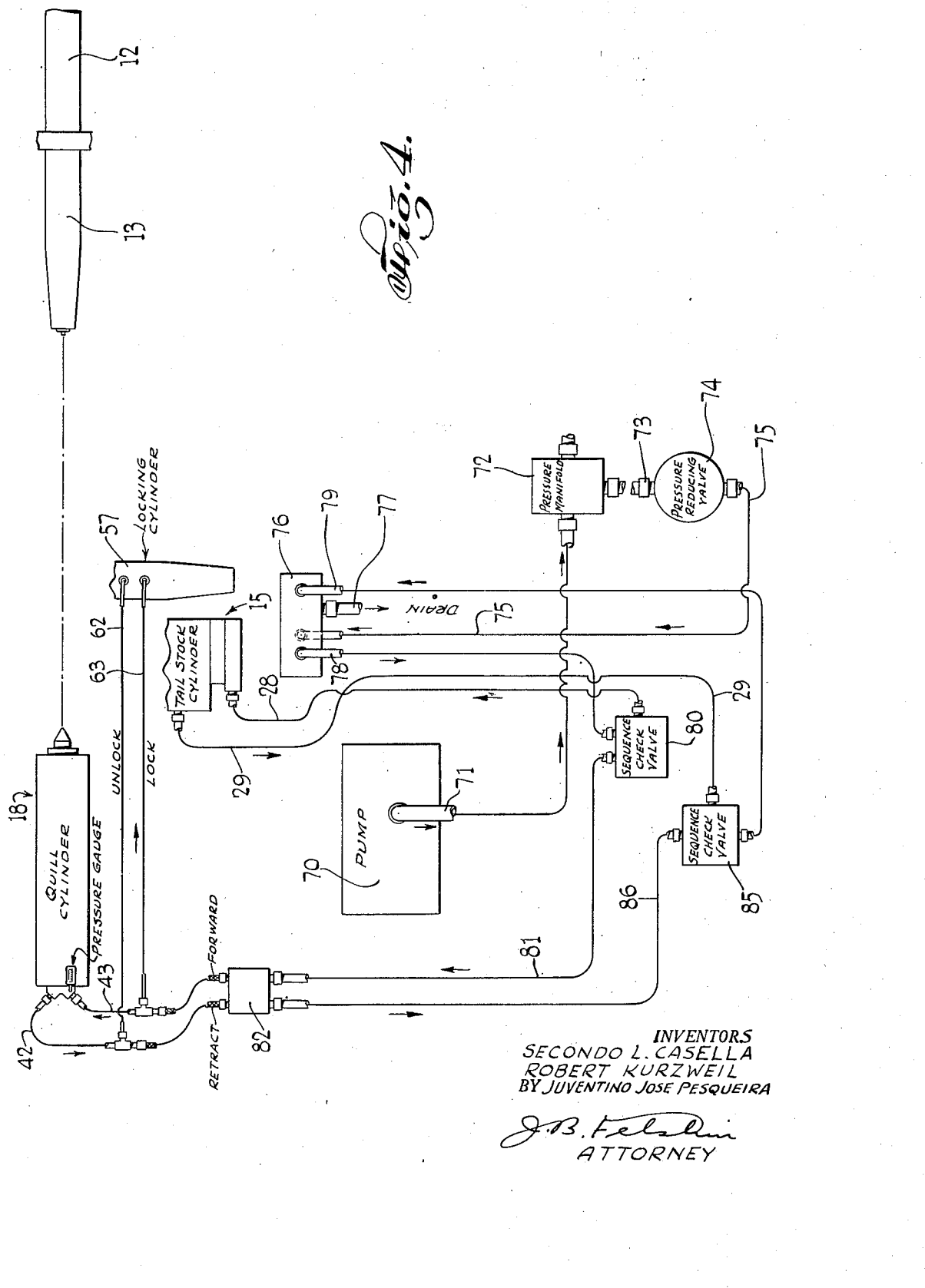

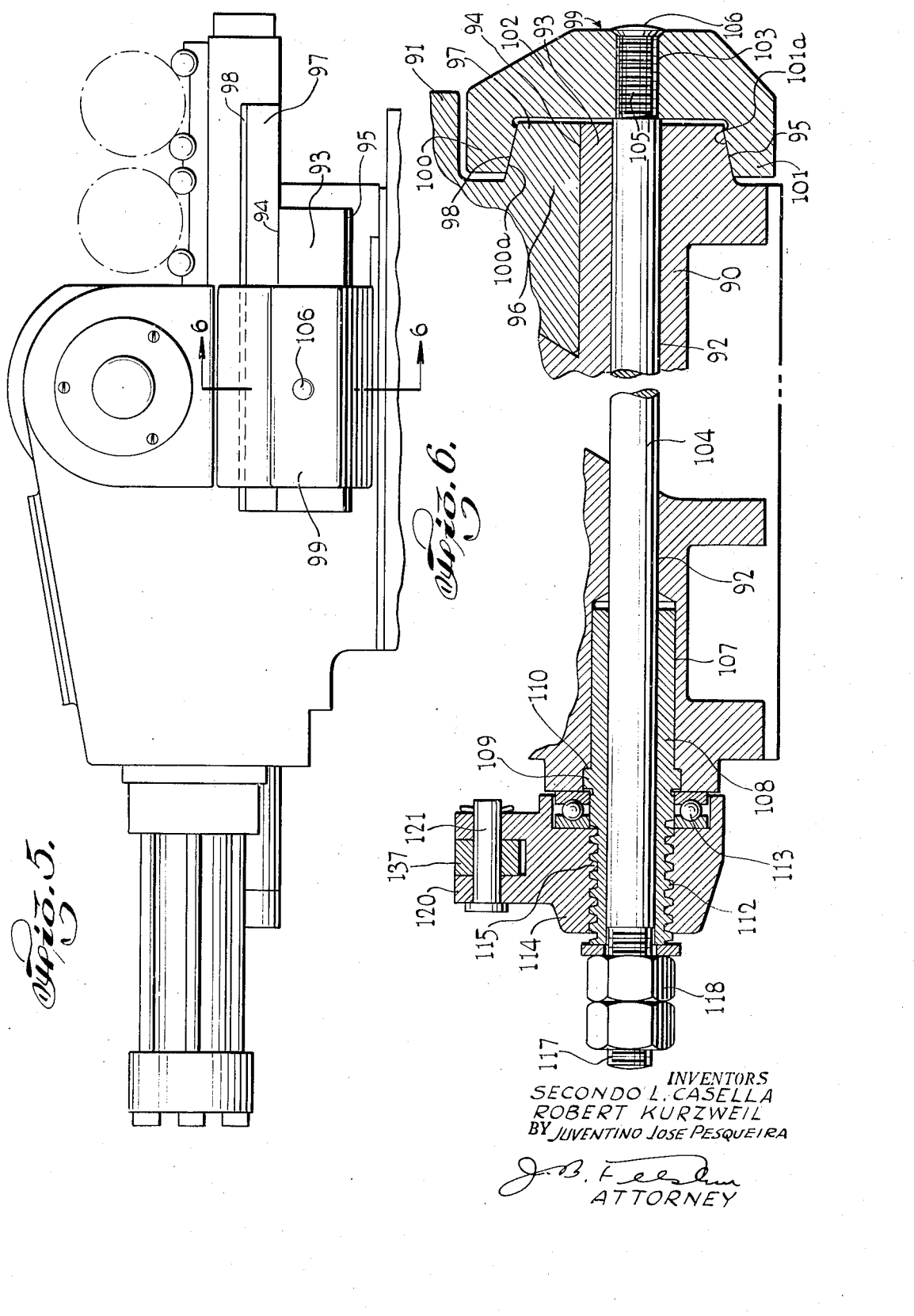

Jan. 3, 1950  S. L. CASELLA ET AL  2,493,475
MACHINE TOOL
Filed June 1, 1945  6 Sheets-Sheet 6
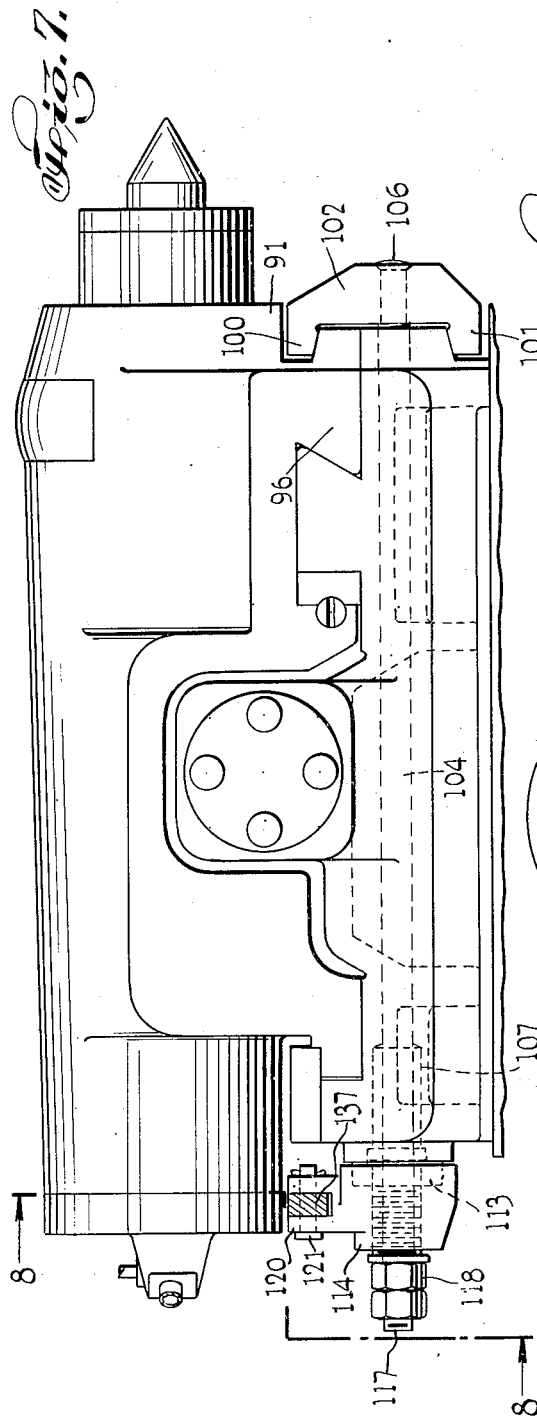
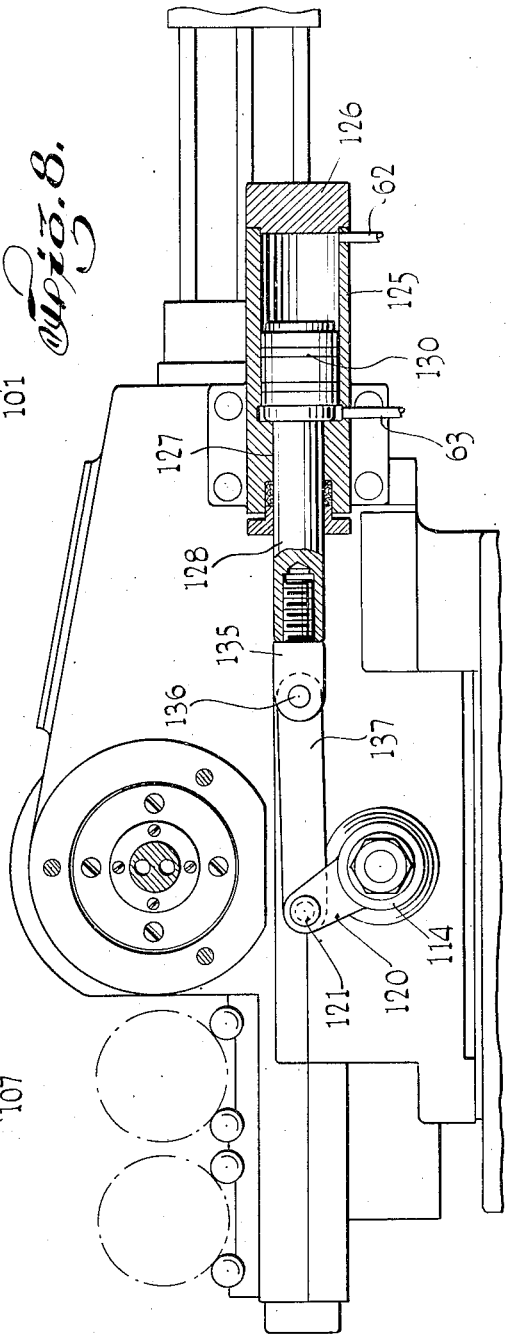
INVENTORS
SECONDO L. CASELLA
ROBERT KURZWEIL
BY JUVENTINO JOSE PESQUEIRA
ATTORNEY Patented Jan. 3, 1950

2,493,475

UNITED STATES PATENT OFFICE 2,493,475

MACHINE TOOL

Secondo L. Casella, Robert Kurzweil, and Juventino Jose Pesqueira, New York, N. Y., assignors to Morey Machinery Co., Inc., New York, N. Y., a corporation of New York Application June 1, 1945, Serial No. 597,140

5 Claims. (Cl. 82—31)

This invention relates to machine tools. It is particularly directed to a lathe provided with a tailstock.

An object of this invention is to provide in a lathe of the character described, a tailstock movable to one side of the axis of the lathe spindle and provided with a tailstock center adapted to engage the work piece when the tailstock is in one position, and means to insure the tailstock center remaining exactly at the axis of the spindle resulting in rotation of the work piece accurately about its axis during the turning of the work piece.

Another object of this invention is to provide in a lathe, a tailstock movable at right angles to the axis of the spindle, a tailstock center on the tailstock, and means to sequentially move the tailstock to a position where the tailstock center is at the axis of the spindle, move the tailstock center against the work piece, lock the tailstock against side movement, retract the tailstock center, unlock the tailstock, and move the tailstock back to a position where the tailstock center is offset from the axis of the spindle.

Another object of this invention is to provide in a lathe, a bed, a carriage slidably mounted on the bed for longitudinal movement, a tailstock mounted on the carriage for sliding movement in a horizontal plane at right angles to the longitudinal axis of the bed, a tailstock center or quill on the tailstock, and means to lock the tailstock to the carriage.

Yet a further object of this invention is to provide in a lathe of the character described, a carriage slidably mounted on the bed of the lathe, a tailstock slidably mounted on the carriage for movement transversely of the direction of movement of the carriage, a tailstock center slidably mounted on the tailstock for movement in a direction parallel to the axis of the lathe, and hydraulic means for moving the tailstock toward and away from a normal position where the tailstock center is at the axis of the spindle, hydraulic means for moving the tailstock center into engagement with the work and for retracting the tailstock center, and hydraulic means to lock the tailstock to the carriage and to unlock said tailstock.

Yet a further object of this invention is to provide in a lathe of the character described, means dependent upon movement of the tailstock center into engagement with the work piece, to lock the tailstock against movement, and means dependent upon retraction of the tailstock center to unlock said tailstock.

Another object of this invention is to provide in a lathe of the character described, a tailstock movable at right angles to the axis of the lathe spindle, a tailstock quill or center on the tailstock movable longitudinally of the lathe, a locking device to lock the tailstock against movement, and manually initiated hydraulic means to sequentially move the tailstock to a position where the center is at the axis of the lathe spindle, move the tailstock center into engagement with a work piece, and lock the tailstock against movement, said hydraulic means being so arranged that the same may be manually initiated thereafter to sequentially retract the tailstock center, unlock the tailstock, and move the tailstock to a position where the tailstock center is offset from the axis of the lathe spindle.

Still a further object of this invention is to provide a strong, rugged and durable lathe construction of the character described which shall be relatively inexpensive to manufacture, smooth and positive in operation, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a top plan view of a tailstock for a lathe embodying the invention;

Fig. 2 is a cross-sectional view taken on line 2—2 of Fig 1;

Fig. 3 is a cross-sectional view taken on line 3—3 of Fig. 1;

Fig. 4 is a diagram illustrating the hydraulic control system;

Fig. 5 is a rear view of a tailstock embodying the invention and illustrating a modified construction;

Fig. 6 is a cross-sectional view taken on line 6—6 of Fig. 5;

Fig. 7 is a side elevational view of the structure shown in Fig. 5;

Fig. 8 is a cross-sectional view taken on line 8—8 of Fig. 7; and

Fig. 9 is a view similar to Fig. 6 but illustrating another modified construction.

Figure 1:
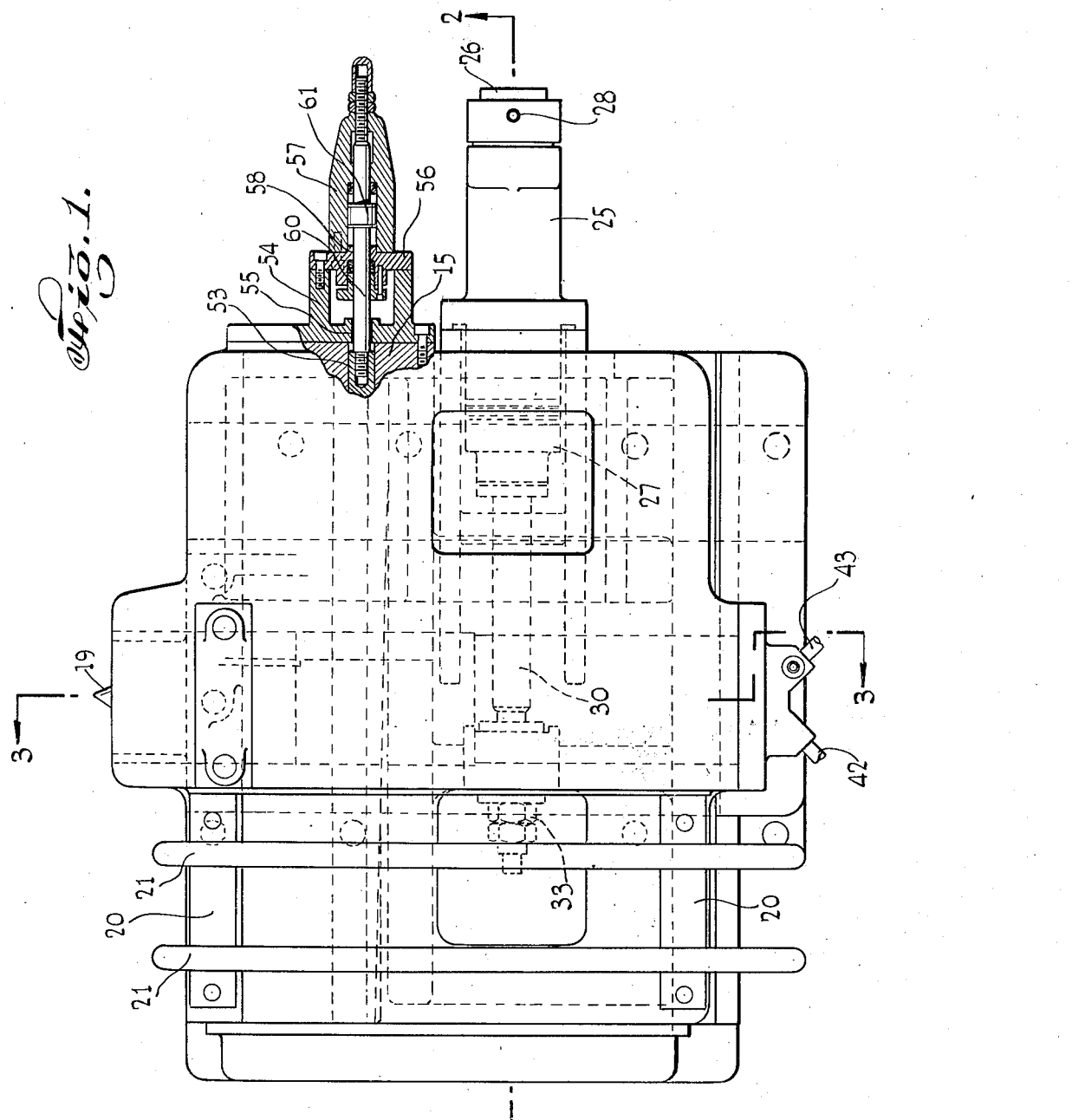

Referring now in detail to the drawing, 10 designates a lathe embodying the invention. The same comprises a horizontal lathe bed. The lathe to which the present invention relates may be of the general type shown in co-pending application of Secondo L. Casella, Serial No. 548,337. Said lathe is provided with a spindle which may be designated by numeral 12 (Fig. 4) carrying an expanding mandrel 13 on which a shell or other work piece may be mounted. However, the invention may be used for other types of lathes as will appear hereinafter.

On the bed 11 there is slidably mounted for longitudinal movement a carriage 15. Slidably mounted on the carriage for movement thereon transversely of the axis of the spindle, is a tailstock 16. The tailstock 16 is provided with a longitudinal cylindrical portion 17 in which is slidably mounted a cylinder 18 carrying a tailstock center 19. Extending to one side of the tailstock is a platform 20 carrying a pair of rails 21 on which the work piece W may be placed to facilitate mounting of the work piece onto the mandrel 13.

The carriage may be slidably moved longitudinally of the bed by any suitable means (not shown).

Means is provided for moving the tailstock transversely of the carriage. To this end there is mounted on the carriage 15 a cylinder 25. At the ends of the cylinder 25 are heads 26 and 27. Any suitable hydraulic medium may be supplied to one side of cylinder 25 through a conduit 28 connected to head 26. The hydraulic medium may be supplied to the opposite side of the cylinder through a conduit 29 connected to the head 27. The head 27 is formed with a central opening and slidably extending therefrom is a piston rod 30. At one end of the rod is a piston 31 slidable within the cylinder 25. The piston rod is clamped to an extension 32 of the tailstock by means of nuts 33.

The cylinder 18 is formed with a cylindrical chamber opening 35, opening to the rear. The rear end of the cylindrical chamber 35 is closed by a head 36 formed with a through opening 37. Extending through the through opening 37 is a piston rod 38. On the piston rod 38 is a piston 39 within cylindrical chamber 35. The piston rod 38 is formed with one opening 40 which opens into the chamber 35 of one side of the piston 39. Said piston rod is formed with a second opening 41 which opens within the cylindrical chamber on the opposite side of said piston. Passage 40 is connected to pipe or conduit 42, whereas passage 41 is connected to pipe or conduit 43. It will be noted that the rear end of cylinder 17 is closed by a plate 45. The rear end of the piston rod 38 is fixed to said plate 45. Said plate is formed with passages 40a and 41a connecting the passages 40 and 41 with conduits 42 and 43, respectively.

The cylinder 18 is formed with a transverse wall 18a mediately the ends thereof. At the front of cylinder 18 is a chamber 46 which opens to the front. Said chamber is closed by a cap 47 attached thereto by screws 47a. Within said chamber are a pair of spaced bearings 48 supporting a tailstock center or quill 19. The tailstock center 19 thus moves with the cylinder 18 whereas the piston rod 38 and piston 39 are fixed with respect to the tailstock.

When liquid enters passage 41, the cylinder 18 together with the tailstock center 19, move forwardly to engage the work piece on the mandrel, and liquid is simultaneously drained through passage 40. However, when liquid is forced through passage 40, the cylinder 18 and tailstock center 19 will be retracted and liquid will simultaneously be drained through passage 41.

The carriage 15 is formed with a dove-tailed guide 50. The tailstock 16 is formed with a dovetail groove 51 receiving the dove-tailed guide 50. Between the guide 50 and a surface 52 of the groove 51, is a gib 53. The gib 53 is tapered. When it is moved to the left, looking at Fig. 1, it will lock the tailstock to the carriage. When it is moved to the right, the tailstock will be released so that it may slide relative to the carriage.

Means is provided to move the gib to locking and unlocking position, respectively. To this end there is fixed on the carriage 15 a bracket 54 formed with a through opening 55 adjacent one end of the gib 53. Fixed to bracket 54 is a plate 46; and fixed thereto is a cylinder 57. Plate 56 is formed with a central opening 58. Extending through the openings 55 and 58 is a piston rod 60. One end of the piston rod is screw threaded to one end of the gib 53. On the piston rod 60 is a piston 61 within the cylinder 57. The cylinder 57 is connected to a conduit or pipe 62 communicating with the inside of the cylinder and on one side of the piston. Said cylinder is also connected to a pipe 63 communicating with the inside of the cylinder at the opposite side of the piston. When liquid enters the cylinder through pipe 62, the piston 61 is retracted to unlock the tailstock. When liquid enters the pipe 63, the piston 61 is moved to the left, looking at Fig. 1, to move the gib in the opposite direction for locking the tailstock to the carriage against movement transversely of spindle axis.

In Fig. 4 there is illustrated the hydraulic system for operating the tailstock, the quill, and the locking gib. In said figure, 70 designates a pump connected by conduit 71 to a pressure manifold 72. The manifold 72 is connected by pipe 73 to a pressure reducing valve 74. The valve 74 is connected by conduit 75 to a manifold or valve block 76. Connected to the manifold 76 is a drain pipe 77. There is also connected to the manifold, pipes 78 and 79. On the manifold 76 is a hand operated valve (not shown), which when turned in one direction to a predetermined position, interconnects pipes 75 and 78, and at the same time interconnects pipe 79 to the drain pipe 77. Upon turning the handle to another predetermined position, pipe 78 is interconnected to the drain 77, and pipe 75 interconnects to pipe 79. Pipe 78 is connected to a sequence and check valve 80. The valve 80 has one outlet connected to pipe 28. Said valve has another outlet connected to a pipe 81 which passes through a manifold 82 and connects to said pipe 43. Pipe 43 is connected to said pipe 63. The check valve 80 is so arranged that pipe 78 is connected therethrough first to pipe 28, but when a predetermined pressure is built up therein, the connection between pipe 78 and 28 is shut off, and automatically pipe 78 connects to pipe 81. Pipe 79 is connected to sequence and check valve 85 similar to valve 80. Said valve 85 is connected to pipe 29. Said check valve is also connected by a pipe 86 which connects through manifold 82 to pipe 42. Said pipe 42 is connected to said pipe 62 which acts as a bleeder from pipe 42.

The operation of the system will now be explained:

A suitable hand operated valve on manifold 76 is rotated in one direction to a predetermined position for interconnecting pipe 75 with pipe 78 and interconnecting pipe 79 to drain pipe 77. Liquid under pressure will then flow from pump 70 through pipe 71 and pressure manifold 72 to pipe 73, through pressure reducing valve 74 through pipe 75 through a valve passage in manifold 76 to pipe 78, and to the sequence and check valve 80. Liquid under pressure will pass from the check valve to pipe 28 to operate the tailstock cylinder and thereby move the tailstock from an offset position to a position where the tailstock center is in alignment with the axis of the mandrel 13.

While the tailstock is being moved to its normal operative position, liquid will drain out of the tailstock cylinder through pipe 29, through valve 85 to pipe 79, and then through the manifold 76 to the drain pipe 77. It will be noted that the connection in check valve 85 between pipes 29 and 79 is open while pressure is exerted on valve 80. When the tailstock cylinder has moved to normal position, and pressure is built up in valve 80, the connection between pipes 78 and 28 is shut off while the connection between pipes 78 and 81 is open. Fluid under pressure will then move through pipe 81, manifold 82, to pipe 43, and from pipe 43 to passage 41 to cause the cylinder 18 to move forwardly so that the tailstock center 19 engages the shell or other work piece on the mandrel 13.

As fluid passes to the cylinder 18, fluid under pressure will bleed through pipe 63 to the locking cylinder 57 for locking the gib, thereby preventing side movement of the tailstock while the work piece is being turned. The lathe is then operated in a normal way to turn the shell or other work piece on the mandrel.

While the cylinder 18 is moving forwardly, fluid under pressure will be pumped out of the cylinder to pipe 42 through manifold 82 and pipe 86 and through the return valve 85 to pipe 79 and thence through the manifold 76 to drain pipe 77.

Furthermore, as the piston in the locking cylinder 57 moves to lock the gib, liquid will drain through pipe 62 to pipe 42.

After the shell is turned, the handle or valve on manifold 76 is turned to another position for connecting pipe 78 with the drain 77 and connecting pipe 76 to pipe 79. Fluid under pressure will then pass from pipe 75 to pipe 79, to sequence and check valve 85 to pipe 86, through manifold 82, through pipe 42 to the quill cylinder 18 for causing retraction of the cylinder. The fluid will pass from pipe 42 to passage 40 to retract the center 19. At the same time, fluid will be drained from cylinder 35 through passage 41 to pipe 43 to pipe 81, valve 80, pipe 78, manifold 76 and drain pipe 77. The tailstock center will thus be retracted.

At the same time, pressure is built up from pipe 42 to pipe 62 to the cylinder 57 for retracting the gib to thus release the tailstock. When enough pressure is built up in the valve 85, the connection between pipes 79 and 86 is shut and the connection between the pipes 79 and 29 is opened. Fluid under pressure then passes through pipe 79 through check valve 85, through pipe 29, to the tailstock cylinder for moving the tailstock off center. Such movement will cause fluid from tailstock cylinder to drain through pipe 28 through the open valve 80, to pipe 78, and through the manifold 76 to drain pipe 77.

It will now be understood that when the tailstock is off center as shown in Fig. 2, the rails 21 will be in such position that a shell W on the rails may easily be pushed onto the mandrel. While the tailstock is in such position, a turned shell may be pulled off the mandrel onto the rails from where it can easily be removed. After one shell is removed another shell is put on the rails, loaded onto the mandrel, and then the sequence of operation can be initiated for bringing the tailstock back into place, moving the center into engagement with the shell, and then locking the tailstock.

In Figs. 5, 6, 7 and 8 there is shown a modified construction which relates to the means for locking the tailstock against movement when the tailstock is in such position that the tailstock center is at the axis of the mandrel. Thus in the modification of Figs. 5 to 8, the locking gib is replaced by clamping means to be described hereinafter.

In Figs. 5 to 8, there is shown a carriage 90 slidably mounted on the bed of the lathe in any suitable manner. Slidably mounted on the carriage 90 for transverse movement is a tailstock 91. The tailstock 91 may be substantially similar to the one described above, and is provided with a tailstock center operated in the manner similar to that described in Figs. 1 to 4. The carriage is provided with a transverse through opening 92. It is also provided with a projection 93 having a flat horizontal top surface 94 and a downwardly and inwardly inclined lower surface 95. The tailstock 91 is formed with a portion 96 slidably mounted on surface 94 and formed with a projection 97 complementary to projection 93 and formed with an upwardly and inwardly inclined surface 98. Engaging the projections 93, 97 is a forked clamp member 99. Member 99 has top and bottom arms 100, 101 interconnected by a vertical portion 102. Arm 100 has a lower inclined surface 100a contacting surface 98. Arm 101 has an incline surface 101a contacting the surface 95. Projection 97 is of greater length than the projection 93 as shown in Fig. 6 of the drawing. Portion 102 of the clamp 99 is formed with a screw threaded opening 103. Extending through opening 92 is a rod 104 having a screw threaded end portion 105 screwed within the threaded opening 103 and riveted over at its end to the clamp as indicated by numeral 106.

The carriage 90 is formed with a countersunk or enlarged opening 107 communicating with the through opening 93. Projecting into opening 107 is a sleeve 108 formed with a collar 109 contacting an internal shoulder 110 at the opening 107. Sleeve 108 is formed with external threads 112. On said sleeve is a thrust bearing 113 contacting a side of the carriage. Surrounding the sleeve is a nut 114 contacting the thrust bearing and having threads 115 engaging the threads 112. The outer end of rod 104 is screw threaded as at 117. Lock nuts 118 on the screw threaded portion 117 serve to clamp the sleeve within opening 107. The thrust bearing 113 is interposed between the nut 114 and the carriage, as shown in the drawing. Nut 114 is formed with a pair of upwardly extending bifurcated ears 120 supporting a transverse pivot pin 121 for the purpose hereinafter explained.

On the carriage is a horizontal cylinder 125. On one end of the cylinder is a head 126. At the other end of the cylinder is a through opening 127. Extending through opening 127 into the cylinder is a piston rod 128. On the piston rod 128 and within the cylinder 125 is a piston 130. Connected to the cylinder 125, and on one side of the piston, is said pipe 62 and connected to said cylinder and communicating with the opposite side of the piston, is said pipe 63.

Screwed to one end of the piston rod 128 is a connecting member 135. Member 135 carries a transverse pivot pin 136. Interconnecting the pin 121 with pin 136 is a link 137. It will now be understood that when liquid under pressure passes through pipe 63, piston 130 will be moved to the right, thereby rotating the nut in a clockwise direction, looking at Fig. 8. Such a movement will cause sleeve 108 to be moved to the left, looking at Fig. 6, for pulling rod 104 to the left, thereby causing clamp 102 to clamp the tailstock to the carriage. When liquid under pressure enters through pipe 62, piston 130 will move to the left, looking at Fig. 8. If liquid under pressure enters pipe 62, piston 130 will move to the left, looking at Fig. 8, thereby rotating the nut 114 in a counterclockwise direction to release the clamp.

In Fig. 9 there is shown another modified form of clamp. The clamp of Fig. 9 is the same as the clamp of Figs. 5 to 8, except that the clamp is directly connected to a piston within a hydraulic cylinder. Thus in Fig. 9, numeral 99 designates a clamp to clamp the tailstock to the carriage. Connected to clamp 99 is a horizontal rod 130 passing through a bore 131 in the carriage. The rod 130 is connected to a piston 133 within a cylinder 134. At the opposite ends of the cylinder are heads 135 and 136. The head 136 is formed with a passage 137 communicating with the interior of the cylinder on one side of the piston. The head 135 is formed with a passage 138 communicating with the cylinder on the opposite side of the piston. Connected to passage 137 is said pipe 63. Connected to passage 138 is said pipe 62. When fluid enters the cylinder through pipe 63, piston 133 will be moved to the left to clamp the clamp 99. When fluid enters pipe 62, the clamp is released.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described our invention, we claim as new and desire to secure by Letters Patent:

1. In a lathe having a bed, a carriage longitudinally movable on the bed, a tailstock transversely movable on the carriage, a cylinder on the carriage, a piston in the cylinder, means to connect the piston to the tailstock, a cylinder on the tailstock, a tailstock center fixed to the last-mentioned cylinder, a second piston in the second cylinder, means to connect the second piston to the tailstock, a clamp for clamping the tailstock to the carriage, a third cylinder on the carriage, a third piston in the third cylinder, means to connect the third piston to the locking means, and means to first supply liquid under pressure to one side of the piston in the first cylinder to move the tailstock to a position where the tailstock center will become aligned with the axis of the lathe, then pump liquid under pressure to one side of the piston in the second cylinder to move the tailstock center into engagement with a work piece, and then supply liquid to one side of the piston in the third cylinder, to lock the locking means.

2. In a lathe having a bed, a carriage longitudinally movable on the bed, a tailstock transversely movable on the carriage, a cylinder on the carriage, a piston in the cylinder, means to connect the piston to the tailstock, a cylinder on the tailstock, a tailstock center fixed to the last-mentioned cylinder, a second piston in the second cylinder, means to connect the second piston to the tailstock, a clamp for clamping the tailstock to the carriage, a third cylinder on the carriage, a third piston in the third cylinder, means to connect the third piston to the locking means, means to first supply liquid under pressure to one side of the piston in the first cylinder to move the tailstock to a position where the tailstock center will become aligned with the axis of the lathe, then pump liquid under pressure to one side of the piston in the second cylinder to move the tailstock center into engagement with a work piece, and then supply liquid to one side of the piston in the third cylinder, to lock the locking means, and manually controlled means to thereafter supply liquid to the other side of the piston in the second cylinder for retracting the tailstock center, then supply liquid under pressure to the other side of the piston in the third cylinder for releasing the locking means, and then supply liquid to the other side of the piston in the first cylinder to move the tailstock from a position where the tailstock center is in alignment with the axis of the lathe to an offset position relative thereto.

3. In a lathe equipped with a slidable tailstock and a slidable tailstock center slidably mounted on said tailstock, in combination, releasable locking means to lock said slidable tailstock; first operating means for sliding said slidable tailstock; second operating means for sliding said tailstock center; third operating means for operating said locking means; first actuating means connected with said first operating means for manual actuation of the same; second actuating means serving for actuating said second operating means and influenced by said first actuating means so as to automatically actuate said second operating means at the end of operation of said first actuating means; and third actuating means serving for actuating said third actuating means and connected with said second actuating means in such a manner as to be automatically actuated by the same after start of operation of said second actuating means.

4. In a lathe equipped with a slidable tailstock and a slidable tailstock center slidably mounted on said tailstock, in combination, releasable locking means to lock said slidable tailstock; manually operable operating means for sliding said slidable tailstock; first automatic operating means for sliding said tailstock center constructed so as to be actuated by said manually operable operating means so as to automatically start sliding of said slidable tailstock center the moment sliding of said slidable tailstock is terminated; and second automatic operating means for operating said locking means combined with said first automatic operating means so as to be actuated by said first automatic operating means after start of operation of the same.

5. In a lathe equipped with a slidable tailstock and a slidable tailstock center slidably mounted on said tailstock, in combination, releasable locking means to lock said slidable tailstock; manually operable operating means for sliding said tailstock center; first automatic operating means for operating said locking means combined with said manual operating means for sliding said tailstock center so as to be actuated by said manually operable operating means the moment sliding of said tailstock center is terminated; and second automatic operating means for sliding said slidable tailstock combined with said first automatic operating means so as to be actuated by said first automatic operating means after termination of operation of the same.

SECONDO L. CASELLA.
ROBERT KURZWEIL.
JUVENTINO JOSE PESQUEIRA.

REFERENCES CITED

The following references are of record in the file of this patent:

UNITED STATES PATENTS

| Number | Name | Date |
| --- | --- | --- |
| Re. 22,621 | Groene | Mar. 20, 1945 |
| 1,035,784 | Greenleaf | Aug. 13, 1912 |
| 1,981,263 | Croft | Nov. 20, 1934 |
| 2,473,093 | Conn | June 14, 1949 |